United States Patent [19]

Kutsch

[11] 4,342,806
[45] Aug. 3, 1982

[54] COMPOSITE ELASTOMERIC SPRING BELT
[75] Inventor: Howard J. Kutsch, Wilmington, Del.
[73] Assignee: E. I. Du Pont de Nemours and Company, Wilmington, Del.
[21] Appl. No.: 157,512
[22] Filed: Jun. 9, 1980
[51] Int. Cl.³ .............................................. F16D 3/58
[52] U.S. Cl. .................... 428/174; 428/252; 428/480; 428/482; 428/542; 464/55
[58] Field of Search ............... 74/411, 574; 192/106.1, 192/328; 64/27 NM, 11 R, 12; 428/252, 174, 480, 482, 542

[56] References Cited
U.S. PATENT DOCUMENTS

| | | | |
|---|---|---|---|
| 4,012,962 | 3/1977 | Balloy | 74/233 |
| 4,076,226 | 2/1978 | Anolick | 267/139 |
| 4,136,715 | 1/1979 | McCormack | 138/130 |
| 4,266,409 | 5/1981 | Kutsch | 64/12 |

Primary Examiner—Marion McCamish

[57] ABSTRACT

A composite belt suitable for use as an energy absorber or improved spring in a torque converter said belt having a fixed preformed endless path and at least three sides joined by curvilinear path changing sections, the belt comprises a plurality strands, tapes or films of a copolyetherester elastomer that is oriented in the direction of their length and embedded within a matrix of a lower melting point copolyetherester elastomer that substantively surrounds the individual strands, tapes or films of the oriented copolyetherester elastomer forming a self-supporting structure that does not collapse upon itself when laid on one side of its outside perimeter, said belt when stretched from about 5–30% of the length of its perimeter returns to substantially its original size when force is removed.

4 Claims, 4 Drawing Figures

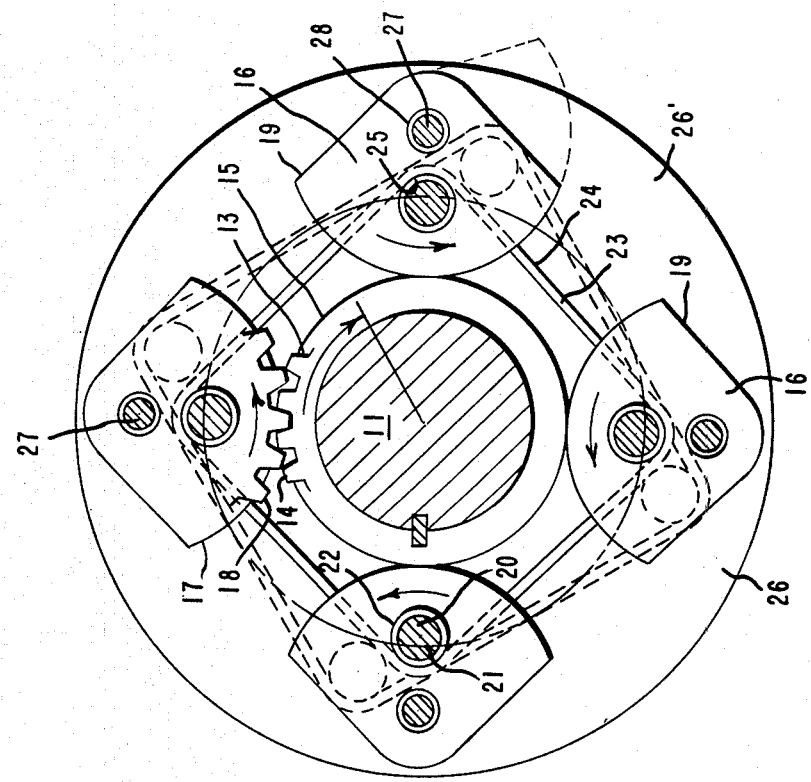
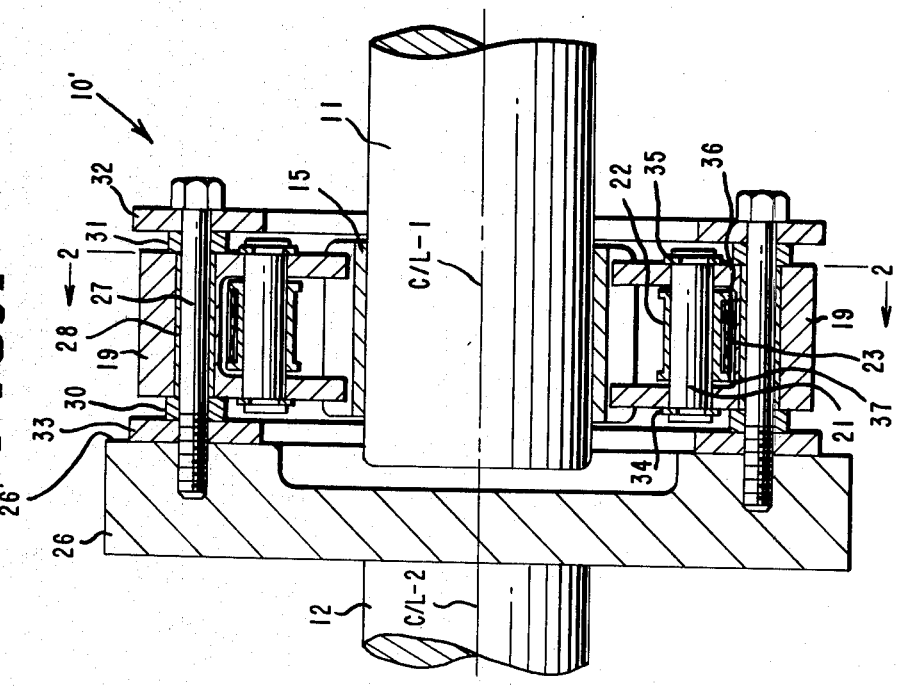

COMPOSITE ELASTOMERIC SPRING BELT

BACKGROUND OF THE INVENTION

This invention is directed to a preformed, shaped oriented copolyetherester elastomeric belt having straight sides that functions as a spring and is capable of absorbing energy when used in a torque converter.

Various types of couplings to connect an input shaft to an output shaft to supply power from a prime mover to a load are known. Frequently, the shafts are "locked" together in a manner such that torsional vibrations or shocks on either the input or output shaft are transmitted to the other shaft, many times with amplification, as well as to other parts of the apparatus. These vibrations, or shocks, may be caused by power surges, misfires and from sudden changes in demand load.

In the acceleration and deceleration of a given load, for example, short-term discontinuities of the energy flow, including reverse direction flow, may occur and this may result in such objectionable conditions as bumps or jerks or even cause harm to the equipment or stalling of the prime mover. This is particularly true in systems where a constantly or already running prime mover picks up a load when a clutch in the power train is actuated. Turning on an automobile air conditioner, for example, clutches in a heavy load, the compressor, in an already running power train which may be at a great variety of power conditions. Similarly, "locking up" the torque converter of an automatic transmission when cruising conditions are attained is a situation where load and input may be momentarily mismatched depending on the amount of hydraulic slip at the instant of engagement. In all of these systems, and others, troublesome vibrations or shocks may occur and with them inherent problems in the operation of such systems.

It is desirable to provide locked-up shafts with a cushioning device so that torsional vibrations or shocks are largely absorbed and not substantially transmitted from one shaft to the other. For example, in automotive vehicles that make use of an automatic transmission it may be desirable to include a lock-up clutch to couple the engine drive shaft directly to the transmission input shaft when the vehicle reaches a certain speed. Its purpose is to eliminate fuel losses related to torque converter slip. Shocks ordinarily occur during lock-up. Further, if the shafts are rigidly locked by this clutch, torsional vibrations or shocks on either shaft are transmitted to the other, as well as to the rest of the vehicle and its occupants. A torque cushioning device in series with the clutch is therefore desirable. Such a torque cushion must handle full engine torque, and any fractional part thereof, plus or minus the torsional vibrations derived from cyclic engine firing and other changes in demand load by the wheels. The softer the cushion, the lower will be its natural frequency, and the better it will be for shock and vibration damping.

It, therefore, has become standard practice to incorporate some form of cushioning coupling in shaft lock-up systems to take up the initial load and to damp out bumps in operation. Metal compression springs have been used for the torque cushioning portion of a torque converter, such as a lock-up clutch in an automotive vehicle, but their very presence, i.e, the space they occupy, plus their necessary loading elements, severely limits the amount of differential rotation permitted between the two shafts. Such systems are hard cushions with correspondingly high natural frequencies of vibration and, therefore, they perform poorly in response to sudden power surges and do little toward the damping of external vibrations. At certain speed conditions a noticeably jerky motion occurs.

SUMMARY OF THE INVENTION

It has now been discovered that an oriented copolyetherester elastomeric belt that functions as a spring can be used for transferring torque from one shaft to another. The elastomeric belt or spring is particularly useful in conjunction with a torque converter lock-up clutch in motor vehicles and is effective in absorbing the shock of lock-up in an automatic transmission system and in damping vibrations between the engine and transmission shafts.

The present invention is an article of manufacture comprising a composite belt that is suitable for use as an energy absorber in a torque converter, said belt having a fixed preformed endless path and at least three sides joined by curvilinear path changing sections, the belt comprises a plurality of strands, tapes or films of a copolyetherester elastomer that is oriented in the direction of their length and embedded within a matrix of a lower melting point copolyetherester elastomer that substantially surrounds the individual strands, tapes or films of the copolyetherester elastomer forming a self-supporting structure that does not collapse upon itself when laid on one side of its outside perimeter said belt when stretched from about 5-30% of the length of its perimeter returns to substantially its original size when force is removed. Preferably, the plurality of straight sides of the belt are of substantially equal length and although the belt can have many sides, usually it has from three to five sides, depending on the particular size of the belt and end use. The belt is of sufficient stiffness to retain its shape. The melting point difference between the two copolyetherester elastomers used in the belt is selected to be sufficient that the higher melting point material does not lose its orientation when the lower melting point material is bonded thereto as the matrix.

The preformed, composite oriented copolyetherester elastomeric belt can be used as a flexible connecting member in an apparatus having at least three rotatable members operably connected to three shafts, one shaft being driven by another. Each of these rotatable members has a connecting part eccentrically mounted on it and a flexible connecting member connects these connecting parts together so that when one of the shafts is rotated this causes the rotatable member to rotate and each of the connecting parts on such members is thereby rotated, in an arc, whereby to change the length of the composite elastomeric belt member so that torque is transferred from the shaft being rotated to the other shaft.

The preformed, elastomeric belt is stretched by the steady arcuate movement of the connecting pins in a direction away from the shafts. This places increasing tension on the belt and enables the torque transfer to take place in a desirable manner.

The belt is preformed to have the same number of sides in its closed path as there are connecting pins, and these sides are joined together by curved corners in a curvilinear path. Such curved corners of the belt are trained about the curved connecting members or pins and remain in place on such pins during operation of the apparatus.

BRIEF DESCRIPTION OF THE DRAWINGS

FIG. 1 is a cross-sectional view of an apparatus showing first and second shafts coupled together by means of the multi-sided preformed composite elastomeric belt connected to connecting pins eccentrically mounted on pivotable planet gears which are operatively connected to a sun gear.

FIG. 2 is a somewhat schematic elevational view of the apparatus of FIG. 1 taken along lines 2—2 thereof.

DESCRIPTION OF PREFERRED EMBODIMENTS

Figure 3:
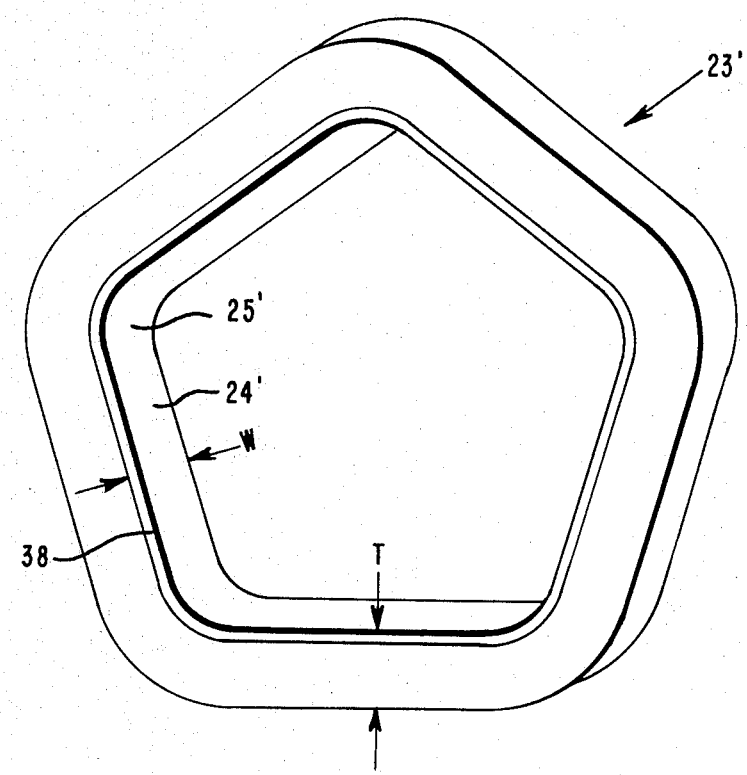
FIG. 3 is a perspective view of a five-sided preformed composite oriented copolyetherester elastomeric belt.

The preformed elastomeric belt is made up of a plurality of path sides, with the number of path sides being determined by the number of pins being used in a torque converter. Thus for the configuration of FIGS. 1 and 2, the belt, which is trained around four (4) connecting parts or pins, has four (4) sides and is nominally square. The curved corners of the belt are shaped to conform to the pin surface, or the surface of a bearing mounted on the pin, with which they are in contact.

The preformed elastomeric belt is molded by well-known means employing, for example, laminating techniques into this generally polygonal-shape with semicircular corners to fit the outside diameter of the bearings or pins over which it is installed. The belt is molded to a specific size so that when such belt is under an initial tensile preload, the elastomeric belt has an initial installed elongation of about 5%. This provides a backlash free assembly that is easy to install and, for normal service temperatures does not creep significantly over normal service life.

The composite elastomeric belt is made of copolyetherester elastomers that consist essentially of a multiplicity of recurring long-chain and short-chain ester units joined head-to-tail through ester linkages, said long-chain ester units being represented by the structure:

and said short-chain ester units being represented by the structure:

wherein:
G is a divalent radical remaining after removal of terminal hydroxyl groups from poly(alkylene oxide) glycol having a number average molecular weight between about 400–6000, e.g., poly(tetramethylene oxide) glycol;
R is a divalent radical remaining after removal of carboxyl groups from a dicarboxylic acid having a molecular weight less than about 300, e.g., phthalic, terephthalic or isophthalic acids; and
D is a divalent radical remaining after removal of hydroxyl groups from a low molecular weight diol having a molecular weight less than about 250;

said short-chain ester units constitute about 15–95% by weight of the copolyetherester and said long-chain ester units constitute the balance. Preferably, the copolyetherester that is oriented contains from about 55–90% by weight short-chain ester units and the lower melting point copolyetherester is selected to have a melting point at least about 5° C. lower.

The copolyetheresters can be made conveniently by a conventional ester interchange reaction. A preferred procedure involves heating the dicarboxylic acid or ester thereof, e.g., dimethyl ester of terephthalic acid, phthalic or isophthalic acid, with a long-chain glycol, e.g., poly(tetramethylene oxide) glycol having a molecular weight of about 600–2000 and a molar excess of diol, e.g., 1,4-butanediol, in the presence of a catalyst at about 150° C.–260° C. and a pressure of 50–500 kPa, preferably ambient pressure, while distilling off methanol formed by the ester interchange. Thus, preferably, in the above formula G is the group remaining after removal of hydroxyl groups from poly(tetramethylene oxide) glycol having a number average molecular weight of about 600–2000; R is the group remaining after removal of carboxyl groups from phthalic, terephthalic or isophthalic acids or mixtures thereof, and D is the group remaining after removal of hydroxyl groups from 1,4-butanediol. At least 1.1 mole of diol should be present for each mole of acid, preferably at least about 1.25 mole of diol for each mole of acid. The long-chain glycol should be present in the amount of about 0.0025 to 0.85 mole per mole of dicarboxylic acid, preferably 0.01 to 0.6 mole per mole of acid.

Preferred copolyesters used for making the belt are those prepared from dimethyl terephthalate, 1,4-butanediol, and poly(tetramethylene oxide) glycol having a molecular weight of about 600–2000. Optionally, up to about 30 mole percent and preferably 5–20 mole percent of the dimethyl terephthalate in these polymers can be replaced by dimethyl phthalate or dimethyl isophthalate. Other preferred copolyesters are those prepared from dimethyl terephthalate, 1,4,-butanediol, and poly(propylene oxide) glycol having a molecular weight of about 600–1600.

The copolyetherester compositions may also contain up to about 5 weight percent of an antioxidant, e.g., between about 0.2 and 5 weight percent, preferably between about 0.5 and 3 weight percent. The most preferred antioxidants are diaryl amines such as 4,4'-bis(, -dimethylbenzyl) diphenylamine.

The preformed elastomeric belt is composed of two copolyetherester elastomers having different melting points. In the composite belt, the higher melting copolyetherester elastomer is in the form of a plurality of strands, tapes or films which are monoaxially oriented in the direction of their length, and the lower melting copolyetherester elastomer is bonded thereto in an unoriented form as a matrix surrounding the individual strands, tapes or films.

The composite belt is shaped by bringing the lower melting point copolyetherester elastomer and the oriented higher melting point copolyetherester elastomer together at a molding temperature below the melting point of the higher melting point copolyetherester elastomer and above that of the lower. The two elastomers are arranged in such a fashion during the layout of the belt that when the lower melting point copolyetherester elastomer becomes fused in the heating step, it adheres adjacent units of the higher melting point oriented copolyetherester elastomer together.

The tape, strand or film of the higher melting point copolyetherester elastomer can be encapsulated in the lower melting point copolyetherester elastomer by coextruding the two elastomers having different melting points in such fashion that the lower melting point copolyetherester elastomer substantially encapsulates the higher melting point copolyetherester elastomer. The composite tape, strand or film can be oriented by stretching at least 300% of its original length and then subjected to a heat setting treatment.

A composite belt of copolyetherester elastomer, wherein oriented elastomer is substantially encapsulated within unoriented elastomer, can be prepared by laying up the appropriate number of layers of composite elastomer around a mandrel having the desired shape. The lay-up on the mandrel is heated to melt the lower melting point encapsulating elastomer without melting the higher melting point oriented core or encapsulated elastomer. The lay-up is cooled to solidify the lower melting point elastomer that bonds the layers together. External pressure can be applied to the piled-up stack during bonding to assure good melt flow and joining of the bonding layers.

The belt can be formed by winding the composite tape on a mandrel with the appropriate cross-section and heat bonding. The mandrel is wrapped with a plurality of copolyetherester elastomer composite layers usually from about 15 to about 60 layers of tape, each layer being about 0.2–0.6 mm thick. The mandrel is shaped to provide the contour of generally straight sides linked by semi-circular curved corners, i.e., curvilinear path changing sections, suited to the bearings or pins over which the belt is to be installed. These curvilinear path changing sections eliminate to a large degree the bending stresses that occur in mechanisms where an endless belt of the standard form (i.e., molded on a circular mandrel), is bent over a small diameter pin or pulley putting the outside diameter in tension and the inside diameter in compression to the detriment of the integrity of the laminated structure. The mandrel is sized so that after manufacturing shrinkage the molded belt fits over the pins in the neutral or initial position with the desired initial elongation.

The oriented copolyetherester elastomer belt of this invention does not deteriorate and retains its elasticity and strength when, for example, it is immersed in transmission fluid at operating temperatures used in an automatic transmission system. The uniqueness of the composite oriented copolyetherester elastomeric belt lies in its exceptionally high stress development capability coupled with its potential for excellent recovery from high strains. This means that high forces can be developed with small cross-sections and that high extensions and, therefore, high degrees of rotation (for torque development and softer cushioning) can be achieved with minimal lengths of belt.

The belt of this invention is not a power transmission belt, nor does it function as a power transmission belt. The belt of this invention functions as a spring and it is used in a lock-up clutch in place of metal springs. Such belt must be capable of stretching during operation up to about 30% of the length of its perimeter and returning to substantially its same size; it is an energy-absorbing torque transmitter that is a cushioning device, it serves no power transmission functions in the sense that term is used in belt and pulley drives.

Referring now to FIGS. 1 and 2, apparatus in which the preformed composite copolyetherester elastomeric spring belt can be used will be described. Apparatus 10 includes a first shaft 11 having a centerline C/L-1 and a second shaft 12 also having a centerline, C/L-2 which is an extension of the centerline of the first shaft 11. The shafts are in end-to-end relationship with each other and either one may be used to drive the other; that is, either the first or second shafts 11 or 12 may be suitably connected to a suitable power source or drive means, not shown, and driven thereby (i.e., it becomes the drive shaft), and in turn, it will drive the other shaft (i.e., the driven shaft) through the shock-absorbing torque converter or coupling of this invention.

The first shaft 11 has gear means 13 on its circumference, as shown in FIG. 2. This gear means 13, in the form of teeth 14, which may be a part of the first shaft 11 or which may be connected to it by appropriate means, enables the shaft 11 to perform as a first rotatable member or sun gear 15.

The second shaft 12 is appropriately connected to at least three pivot means 16, having gear means 17, in the form of teeth 18, on their circumference, as shown in FIG. 2. In this particular embodiment, there are four pivot means. Teeth 18 mesh with the teeth 14 of the gear means 13, as shown, and enables such pivot means 16 to perform as second rotatable members or planet gears 19.

Each of these second rotatable members 19 has a connecting part 20 in the form of a pin 21 eccentrically mounted on one of its surfaces. These pins project outwardly from that surface and having sliding or rolling element bearings 22 journalled thereabout. When these second rotatable members 19 are rotated, this movement causes these pins 21 to pivot or rotate in an arc away from the first and second shafts 11 and 12.

To complete the basic coupling of the shafts 11 and 12, in this apparatus a fixed preformed endless copolyetherester elastomeric belt 23 having a plurality of straight sides and that is self-supporting and does not collapse upon itself when placed on one side is connected to the pins 21 operatively to connect the shafts together. The preformed elastomeric belt 23 is shaped to minimize bending stresses where relatively thick sections are bent over relatively small diameter curves. The elastomeric belt is self-supporting and it is capable of recovering its size and shape after being stretched.

Elastomeric belt 23 is formed so that it has a plurality of sides 24, preferably straight sides, with the number of sides depending on the number of pins about which the elastomeric belt is placed or to which it is connected. The straight sides 24 of elastomeric belt 23 are joined by curvilinear path-changing sections 25 which fit around the periphery of the pins 21, and remain there throughout the operation of the apparatus. The preformed elastomeric belt 23 is positioned on or about the bearings 22 on the pins and stays in place; it differs in this respect from a drive belt which moves relative to pulleys or pins to create a driving force. In conventional friction type drive belts, for example, the belt, which is not self-supporting, moves about a set of pulleys so that power is transmitted through the belt from a drive pulley to a driven pulley, and such belt is constantly moving about or with respect to the pulleys. The performed elastomeric belt 23 is not a power transmission belt adapted for movement in a curved endless path around the pulleys; it instead is an energy-absorbing, energy-storing, shock-absorbing flexible spring.

As operatively connected to the pins 21 the self-supporting, flexible elastomer belt 23 remains in place on the pins 21 during operation. That is so because upon rotation of either the first or second shafts 11 or 12 the second rotatable members 19 are caused to rotate due to the operative connections between both of these shafts and this, in turn, causes the pins 21 also to rotate or move in an arc away from the shaft centerlines to stretch the preformed elastomeric belt 23. This stretching movement slightly changes the length of the preformed elastomeric belt 23, as a function of the relative angular displacement between shafts, sufficiently so that torque is transferred from the shaft that is being driven to the other shaft and the planet gears 19 no longer rotate relative to the sun gear 15.

A typical workable connection, as shown in FIGS. 1 and 2, for example, includes a hub 26 (which functions as a third rotatable member in accordance with this disclosure), which is fixedly secured at one of its surfaces to the second shaft 12 by appropriate means, not shown. A plurality of pivots or studs 27 are fixedly connected to the other surface 26' of the hub 26 and each of the second rotatable members 19 is pivotally connected to the hub 26 through these pivots 27. A suitable bearing 28 is interposed between the pivots 27 and the second rotatable member 19, as is known to the art to permit the pivoting motions to occur.

As shown, the bearings 28 are held in place on the pins 27 between spacer elements 30 and 31 which exhibit low friction. This permits the second rotatable members 19, or pivot means 16, to swing freely. Disposed on either side of the spacer elements 30 and 31 are side plates 32 and 33, which stabilize the structure and also form a subassembly. The pins 21 are held in place on the surface of the second rotatable members 19 by snap rings 34 and 35 while the bearings 22 are held in place on such pins 21 by spacer elements 36 and 37.

The pivots 27 are spaced uniformly on the circumference of a circle having the centerlines of the shafts 11 and 12 as its centerline. The second rotatable members 19 as connected to these pivots 27, as previously described, are pivotable in a plane normal to the centerline of the shafts 11 and 12 and, in this embodiment, basically function broadly as pivot means 16. The connecting parts or pins 21 are fixedly mounted on this pivot means 16 (or second rotatable member 19) and are spaced uniformly on the circumference of a circle also having the centerlines of the shafts 11 and 12 as its centerline. Upon the rotation or pivoting of these second rotatable members 19, such pins 21 will move from the solid line positions in an arc and into the dotted line positions, as shown in FIG. 2. This stretches preformed elastomeric belt 23 until the desired torque transfer forces are created.

Such rotation of the second rotatable members 19 may be brought about by rotating the second shaft 12 and hence the third rotatable member or hub 26, which is fixed to it. This, in turn, will cause the second rotatable members 19 to pivot about their pivots 27, which are fixedly connected to the hub 26. Alternatively, the rotation of these second rotatable members 19 may be brought about by rotating the first shaft 11. When this is done, the meshing teeth, 13 on the first shaft 11 and 14 on the second rotatable members 19 will cause the second rotatable members 19 to pivot about their pivots 27 on hub 26. In other words, as either of the shafts 11 or 12 is rotated in a first direction as shown by the arrow in FIG. 2, this will cause the second rotatable members 19 to rotate, as shown by the arrow, about their pivots 27 and, thus, the arcuate movement of the pins 21 which are fixedly connected to the second rotatable members 19, in a second direction and away from the shafts 11 and 12. This movement changes the length of preformed elastomeric belt 23, by stretching it, and causes the transfer of torque to occur between the shafts 11 and 12 when the force developed in the flexible member is sufficient.

FIG. 3 shows a performed energy absorbing belt 23' useful in association with an automotive torque converter clutch having five (5) planet gears as is described in copending patent application Ser. No. 157,513 (ED-0323) to Seppala et al. filed of even date. This application is hereby incorporated in this disclosure by reference. Belt 23' has five (5) straight sides 24'. Sides 24' are joined by curvilinear path-changing sections 25' which are arcuate in form. The internal edges 38 preferably are chamfered. Width "W" and thickness "T" are selected to suit the application as are other controlling dimensions as will be described further in an example.

Figure 4:
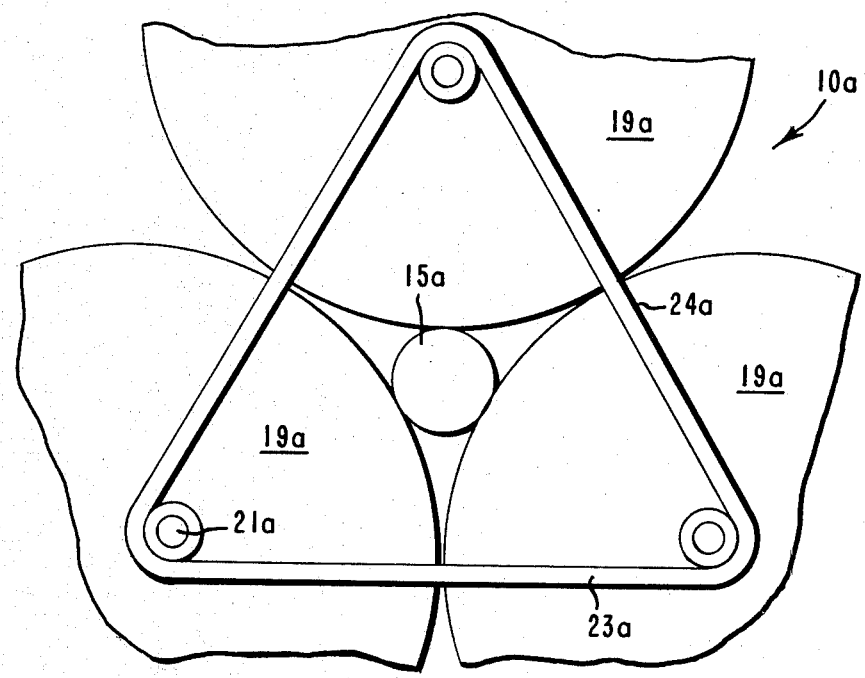
FIG. 4 is another embodiment of an apparatus similar to the apparatus of FIG. 2 shown schematically in elevation, but using a three-sided preformed flexible belt.

The belt of FIGS. 1 and 2 is four-sided. The belt of FIG. 3 is five-sided. The belt 23a of FIG. 4 is three-sided, having three sides 24a, and is employed in apparatus 10a characterized by three planet gears 19a meshing with sun gear 15a and each having a pin 21a eccentrically mounted thereon. This geometry permits using a sun gear 15a that is relatively small compared to planet gears 19a.

EXAMPLE

This example describes the preparation of a belt or spring which is suitable for use in an automotive power train. The spring is formed from a bicomponent copolyetherester tape. The high melting copolyetherester which is used in oriented form in the center of the bicomponent tape is prepared from dimethyl terephthalate, 1,4-butanediol and poly (tetramethylene ether) glycol having a number average molecular weight of about 975 by the procedure of Example 2-A in U.S. Pat. No. 3,763,109 to Witsiepe. The polymer consists of 87.5% by weight butylene terephthalate units and 12.5% by weight poly (tetramethylene ether) terephthalate units. The polymer has a Shore D hardness of 72 and a melting point of 218° C. The lower melting copolyetherester which is applied to both surfaces of the tape to serve as a bonding agent and matrix is prepared from dimethyl terephthalate, 1,4-butanediol and poly (tetramethylene ether) glycol substantially by the procedure of Example 1 of U.S. Pat. No. 3,766,146 to Witsiepe. The copolyetherester contains 60% by weight butylene terephthalate units and 40% by weight poly (teremethylene ether) terephthalate units. It has a Shore D hardness of 55 and a melting point of 211° C. Before use in preparing the tape, the lower melting copolyetherester melt is blended with 6 parts of carbon black per 94 parts of copolyetherester.

A bicomponent tape is formed by coextruding the two copolyetheresters with the higher melting polymer in the interior and the lower melting polymer in a thin layer on both surfaces of the tape. The tape is oriented by drawing at about room temperature with a draw ratio of 4.2 and heat set while preventing retraction for 15 seconds at 150° C. The final tape is 13.46 mm wide, 0.356 mm total thickness with the layer of the low melting copolyetherester on each surface being 0.051 mm thick.

To form the spring, the tape is wrapped on an aluminum mandrel or form having a thickness of 13.63 mm and a cross-section in the shape of a regular pentagon having straight sides 56.13 mm long and rounded corners. The rounded corners are formed by circular arcs having centers located on the lines, spaced evenly 72° apart, connecting the center of the pentagon with its corners at a distance of 36.25 mm from the center of the pentagon and radii of 11.91 mm. The straight sides are tangent to the arcs of the corners.

The mandrel is sandwiched between two 4.76 mm sheets of aluminum which are bolted to the sides of the mandrel. These sheets serve as guides in winding the tape on the mandrel and prevent lateral movement of the layers of tape during subsequent processing steps. Before use the mandrel is sprayed with a light coating of a silicone based mold release (Kroxo 1711, Contour Chemical Co., Woodburn, Mass.). The tape is then wound around the mandrel with a tension of about 5 pounds applied so that the windings are snug and uniform. The starting end of tape is held in place by being pinched by the first wrapping of tape. A total of 51 full turns is applied maintaining tension throughout. The final end of the tape is located over the starting end of the tape. The final end of the tape is secured by placing the mandrel assembly, complete with windings, in a 5-sided jig which presses five strips of brass 58.4 mm×13.72 mm×3.05 mm thick against the sides of the pentagon. Pressure is applied by set screws centered on each side which are turned thumb-tight. The use of the jig also helps maintain the shape of the spring during bonding and improves the degree of bonding. The jig and mandrel are then placed in an oven at a temperature of 218° C. for 100 minutes. At the end of 100 minutes the temperature of the belt is between 211° C. and 218° C. The entire assembly is then removed from the oven and quenched in cold water to about room temperature. The jig is then removed, the sides unbolted from the mandrel and the belt or spring removed. Small amounts of low melting polymer which flows during bonding are removed by sanding. The finished spring has an inner perimeter matching the shape of the mandrel with similar dimensions but with up to about five (5) percent shrinkage. Thus, in free state, a belt made on the mandrel described might have the centers of the circular arcs at a distance of 34.77 mm from the center of the pentagon or a shrinkage of about four (4) percent. The thickness, T, of the spring, measured through the bonded layers of tape is 16.99 mm. Width, W, is about 13.72 mm. The belt is installed in an automotive torque transmitting device similar to that shown in FIGS. 1 and 2 except that five equally spaced planet gears are used in association with a ring gear. The spring is capable of withstanding the forces required to transmit the engine torque to the wheels and is found to cushion the shock when the automatic transmission "locks-up".

OPERATION

The operation of the energy-absorbing belt of this invention can best be described by reference to FIGS. 1 and 2. The apparatus is shown at rest and when a clockwise torque is applied to the input shaft 12 and hence the hub 26, the pins 27 which are mounted on the hub 26 move with it. Thus relative motion takes place between the hub 26 and the shaft 11. This necessarily leads to arcuate motion of pins 21 and an extension of preformed elastomeric belt 23 (see dotted lines in FIG. 2). This lengthening causes a corresponding restoring force in preformed elastomeric belt 23, which, in turn, is communicated to the output shaft 11. This force causes a clockwise torque in the driven or output shaft 11, which increases as the relative motion of the shaft 12 with respect to the shaft member 11 continues. The shaft 11 starts to turn when the torque caused by the stretching of preformed elastomeric belt 23 becomes large enough to overcome the initial resisting torque in the output shaft 11. At first it turns more slowly than the input shaft 12 and the relative displacement continues to increase. The ensuing increasing torque causes the rotation of the output shaft 11 to speed up gradually until the torque supplied by the stretching of preformed elastomeric belt 23 balances the torque caused by the load on the output shaft 11. At this point, the relative motion of the sun and planet gears, 15 and 19, ceases, and the shafts turn in unison. The two shafts are then said to be locked together.

The reverse but entirely equivalent sequence of events takes place when driving power on the input shaft 12 is removed. Thus it is that this device permits smooth and gradual starting and stopping but avoids power loss due to slippage at the full rotational speed.

The preformed elastomeric belt acts similarly when transitory forces act on the machinery to which it is attached, as for instance, misfires, vibrations, or other sudden shocks. These are immediately compensated for by the relative motion of the input and output shafts and, in turn, by corresponding extension or contraction of preformed oriented elastomeric belt 23. The elastic nature of such belts then permits a gradual shock-free return to the original condition, i.e., "locked" rotation of the input and output shafts.

The advantage of this composite elastomeric spring, compared to other springs such as coil metal springs, is the large energy absorption possible in a low volume of material. Further the spring of this invention exhibits desirable high damping characteristics. Still further, the spring of this invention has a low natural frequency minimizing resonance in high speed rotating machinery.

I claim:

1. An article of manufacture comprising a composite belt that is suitable for use as an energy absorber in a torque converter, said belt having a fixed preformed endless path and at least three sides joined by curvilinear path changing sections, the belt comprises a plurality of strands, tapes or films of a copolyetherester elastomer that is oriented in the direction of their length and embedded within a matrix of a lower melting point copolyetherester elastomer that substantially surrounds the individual strands, tapes or films of the oriented copolyetherester elastomer forming a self-supporting structure that does not collapse upon itself when laid on one side of its outside perimeter, said belt when stretched from about 5-30% of the length of its perimeter returns to substantially its original size when force is removed.

2. An article of claim 1 wherein the straight sides of the belt are of substantially equal length.

3. An article of claim 2 wherein the belt has three to five sides.

4. An article of claim 1 wherein the copolyetherester that is oriented contains from about 55-90% by weight short-chain ester units.

* * * * *